(12) United States Patent
Suguro et al.

(10) Patent No.: US 9,666,904 B2
(45) Date of Patent: May 30, 2017

(54) SECONDARY BATTERY

(71) Applicant: NEC Corporation, Tokyo (JP)

(72) Inventors: Masahiro Suguro, Tokyo (JP); Midori Shimura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/410,959

(22) PCT Filed: Jun. 10, 2013

(86) PCT No.: PCT/JP2013/066007
§ 371 (c)(1),
(2) Date: Dec. 23, 2014

(87) PCT Pub. No.: WO2014/007026
PCT Pub. Date: Jan. 9, 2014

(65) Prior Publication Data
US 2015/0194703 A1 Jul. 9, 2015

(30) Foreign Application Priority Data

Jul. 2, 2012 (JP) .................................. 2012-148907

(51) Int. Cl.
*H01M 10/0567* (2010.01)
*H01M 10/056* (2010.01)
(Continued)

(52) U.S. Cl.
CPC ..... *H01M 10/0567* (2013.01); *H01M 2/0262* (2013.01); *H01M 2/0287* (2013.01);
(Continued)

(58) Field of Classification Search
CPC ............ H01M 10/056; H01M 10/052; H01M 10/0585; H01M 2/02; H01M 4/38;
(Continued)

(56) References Cited

U.S. PATENT DOCUMENTS 7,727,677 B2  6/2010  Abe et al.
2003/0082447 A1*  5/2003  Morioka ............... H01M 4/137
                                                                429/213
(Continued)

FOREIGN PATENT DOCUMENTS

CA    2568335 A1   12/2005
EP    1758198 A1    2/2007
(Continued)

OTHER PUBLICATIONS

JP4946437 MT.*
(Continued)

*Primary Examiner* — Alex Usyatinsky
(74) *Attorney, Agent, or Firm* — Wilmer Cutler Pickering Hale and Dorr LLP

(57) ABSTRACT

The present invention relates to a secondary battery, comprising an electrode element in which a positive electrode and a negative electrode are opposed to each other, and an electrolyte solution, wherein the negative electrode active material comprises a metal alloyable with lithium and/or a metal oxide capable of intercalating/deintercalating lithium ions, and the electrolyte solution is a nonaqueous electrolyte solution comprising an electrolyte salt dissolved in a nonaqueous solvent, and comprises a carbonyl compound represented by the following formula (1):

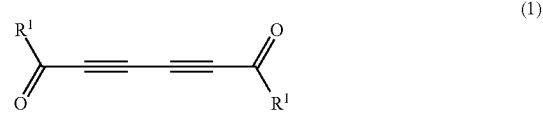

wherein two $R^1$s may be the same or different from each other, and each independently represents hydrogen atom, (Continued)

substituted or unsubstituted alkyl group, cycloalkyl group, alkenyl group, alkynyl group, substituted or unsubstituted aromatic group, oxyalkylene group, substituted or unsubstituted alkoxy group, cycloalkyloxy group, alkenyloxy group, alkynyloxy group, substituted or unsubstituted aromatic oxy group, or oxyalkyleneoxy group.

10 Claims, 1 Drawing Sheet

(51) Int. Cl.
| | | |
|---|---|---|
| *H01M 4/36* | (2006.01) | |
| *H01M 4/38* | (2006.01) | |
| *H01M 4/587* | (2010.01) | |
| *H01M 10/0585* | (2010.01) | |
| *H01M 2/02* | (2006.01) | |
| *H01M 4/13* | (2010.01) | |
| *H01M 10/0525* | (2010.01) | |
| *H01M 10/42* | (2006.01) | |
| *H01M 4/48* | (2010.01) | |
| *H01M 10/052* | (2010.01) | |
| *H01M 10/05* | (2010.01) | |

(52) U.S. Cl.
CPC ............... *H01M 4/13* (2013.01); *H01M 4/36* (2013.01); *H01M 4/38* (2013.01); *H01M 4/386* (2013.01); *H01M 4/483* (2013.01); *H01M 4/587* (2013.01); *H01M 10/052* (2013.01); *H01M 10/056* (2013.01); *H01M 10/0525* (2013.01); *H01M 10/0585* (2013.01); *H01M 10/4235* (2013.01); *H01M 10/05* (2013.01); *H01M 2220/20* (2013.01); *H01M 2300/0025* (2013.01); *Y02T 10/7011* (2013.01)

(58) Field of Classification Search
CPC .... H01M 4/48; H01M 4/587; H01M 10/0567; H01M 2/0287; H01M 4/13; H01M 4/386; H01M 10/0525; H01M 10/4235; H01M 2/0262; H01M 4/483
See application file for complete search history.

(56) References Cited

U.S. PATENT DOCUMENTS

| | | | |
|---|---|---|---|
| 2008/0038644 A1* | 2/2008 | Abe | H01M 10/0525 429/331 |
| 2010/0266904 A1* | 10/2010 | Jeon | H01M 10/0525 429/330 |
| 2010/0279168 A1* | 11/2010 | Lee | H01M 10/0569 429/163 |
| 2013/0266875 A1* | 10/2013 | Matsumoto | H01M 4/38 429/338 |

FOREIGN PATENT DOCUMENTS

| | | | |
|---|---|---|---|
| JP | H06325765 A | | 11/1994 |
| JP | 2003059532 | | 2/2003 |
| JP | 4093699 B2 | | 6/2008 |
| JP | 2008251212 A | | 10/2008 |
| JP | 2010015904 | | 1/2010 |
| JP | 4946437 | * | 6/2012 |
| WO | WO-2005122318 A1 | | 12/2005 |
| WO | WO 2012/002957 | * | 1/2012 |

OTHER PUBLICATIONS

Breslow et al JACS (1974), 96(1)249.*
International Search Reporting corresponding to PCT/JP2013/066007, mail date Aug. 27, 2013, 2 pages.

* cited by examiner

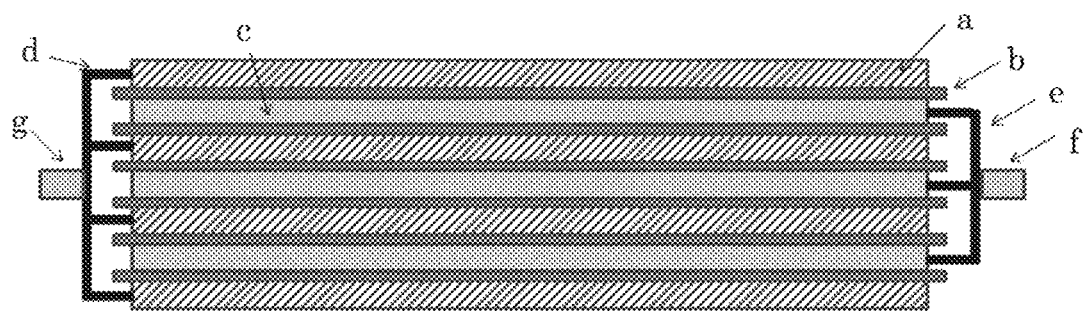

SECONDARY BATTERY

CROSS-REFERENCE TO RELATED APPLICATIONS

This application is a national stage application of International Application No. PCT/JP2013/066007 entitled "SECONDARY BATTERY" filed on Jun. 10, 2013, which claims priority to Japanese Patent Application No. 2012-148907 filed on Jul. 2, 2012, the disclosure of which is hereby incorporated by reference in their entirety.

TECHNICAL FIELD

The present invention relates to a secondary battery, and more particularly, relates to a lithium ion secondary battery.

BACKGROUND ART

Nonaqueous electrolyte secondary batteries such as lithium ion secondary batteries have been already put to practical use as batteries for laptop computers, cellular phones and the like because of their advantages of high energy density, small self-discharge, excellent long-term reliability and the like. In recent years, however, electronic devices have become more sophisticated and the use of batteries in electric vehicles has been expanded, and therefore, there is a demand for development of a secondary battery having a higher energy density.

In such a nonaqueous electrolyte secondary battery, a chemical reaction or decomposition of an electrolyte layer may occur on an electrode surface of a positive electrode and/or a negative electrode. As a result, there arise problems of degradation in the storage characteristic of a battery at a high temperature, degradation of the cycle characteristic of a secondary battery, and generation of a gas from a decomposition product. In order to prevent these problems from occurring, a compound having a function to form a protective coating is added to an electrolyte solution contained in an electrolyte layer. Specifically, when decomposition of the compound added to the electrolyte solution is intentionally accelerated on the surface of a negative electrode active material at the time of initial charge, the thus generated decomposition product forms a protective coating having a protective function, namely, an SEI (Solid Electrolyte Interface), to prevent further decomposition of the electrolyte layer. It has been reported that when the protective coating is thus formed, the chemical reaction or decomposition of the electrolyte layer otherwise occurring on the surface of the negative electrode can be suitably suppressed, and that as a result, an effect of retaining the battery performance of the secondary battery is exhibited.

As an additive for forming a protective coating, use of an oxygen-containing aliphatic compound having alkynyl group and/or alkynylene group (Patent Literature 1), acetylene dicarboxylic ester (Patent Literature 2), 2,4-Hexadienedioic acid dimethyl ester and the like, and vinylene carbonate and/or 1,3-propane sultone (Patent Literature 3), or LiBF$_4$ and acetylene dicarboxylic diester (Patent Literature 4) has been disclosed.

On the other hand, since a secondary battery using conventional graphite-based negative electrode materials have such insufficient capacities that required performances are difficult to attain, investigation utilizing a metal-based negative electrode material, such as silicon or a silicon oxide, as a negative electrode active material have also been made in order to obtain a secondary battery having a high capacity and a high energy density (Patent Literature 5).

CITATION LIST

Patent Literature

Patent Literature 1: Japanese Patent No. 4093699
Patent Literature 2: Japanese Patent Laid-Open No. 2003-059532
Patent Literature 3: WO 2005/122318
Patent Literature 4: Japanese Patent Laid-Open No. 2008-251212
Patent Literature 5: Japanese Patent Laid-Open No. H6-325765

SUMMARY OF INVENTION

Technical Problem

If a secondary battery is charged and discharged at 60° C. or more, there are cases where the capacity with the charge/discharge cycles reduces extremely largely. In particular, a layered laminated type lithium ion secondary battery may expand in some cases when charged/discharged under a high-temperature environment, and thus, there may be the problem of degradation of the cycle characteristic.

As described in Patent Literatures 1 to 4, attempts have been made to improve the cycle characteristic of a secondary battery by including an additive in an electrolyte solution. However, a cycle characteristic, particularly that attained under a high-temperature environment, is insufficient, and there is a demand for further elongation of the lifetime of a secondary battery.

Accordingly, an object of the present invention is to provide a secondary battery that shows an excellent cycle characteristic under a high-temperature environment.

Solution to Problem

The first embodiment of the present invention relates to a secondary battery, comprising an electrode element in which a positive electrode and a negative electrode are opposed to each other, and an electrolyte solution, wherein the negative electrode active material comprises a metal alloyable with lithium, and/or a metal oxide capable of intercalating/deintercalating lithium ions, and the electrolyte solution is a nonaqueous electrolyte solution comprising an electrolyte salt dissolved in a nonaqueous solvent, and comprises a carbonyl compound represented by the following formula (1):

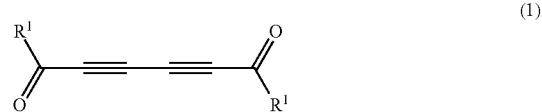
(1)

wherein two R$^1$s may be the same or different from each other, and each independently represents hydrogen atom, substituted or unsubstituted alkyl group, cycloalkyl group, alkenyl group, alkynyl group, substituted or unsubstituted aromatic group, oxyalkylene group represented by the following formula (2):

(2)

wherein R²¹ represents alkylene group having 1 to 6 carbon atoms,
R²² represents hydrocarbon group having 1 to 12 carbon atoms, and n represents an integer of 1 to 10, substituted or unsubstituted alkoxy group, cycloalkyloxy group, alkenyloxy group, alkynyloxy group, substituted or unsubstituted aromatic oxy group, or oxyalkyleneoxy group represented by the following formula (2b):

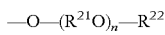  (2b)

wherein R²¹ represents alkylene group having 1 to 6 carbon atoms,
R²² represents hydrocarbon group having 1 to 12 carbon atoms, and n represents an integer of 1 to 10.

The second embodiment of the present invention relates to an assembled battery including a plurality of secondary batteries according to the first embodiment of the present invention.

The third embodiment of the present invention relates to a vehicle including, as a motor driving power supply, the secondary battery according to the first embodiment of the present invention, or the assembled battery according to the second embodiment of the present invention.

Advantageous Effects of Invention

According to an embodiment of the present invention, a secondary battery that is excellent in a cycle characteristic under a high-temperature environment can be provided.

BRIEF DESCRIPTION OF DRAWINGS

FIG. 1 is a schematic cross-sectional view illustrating the structure of an electrode element used in a layered laminated type secondary battery.

DESCRIPTION OF EMBODIMENTS

In a secondary battery of the present invention, a carbonyl compound represented by formula (1) is reduced on the surface of a negative electrode in a charging process and deposits on the surface of the negative electrode to form a coating (an electrode protective film). Since the carbonyl compound represented by formula (1) is more highly reactive than carbonate or the like used as an electrolyte solvent, the compound reductively decomposes on the surface of the negative electrode priorly to the carbonate or the like to form the coating, and hence, excessive decomposition of the electrolyte solvent can be inhibited. Besides, the resulting product has high lithium ion conductivity, and hence does not cause decrease of the charge/discharge speed (degradation of the charge/discharge rate characteristic). Furthermore, since a polymer (an organic polymer) is formed partially in the coating formed by the carbonyl compound represented by formula (1), a strong coating is formed. In other words, a coating formed from the carbonyl compound represented by formula (1) has high lithium ion conductivity and is a strong coating that does not collapse through the charge/discharge cycle of an active material.

Now, an example of the secondary battery of the present invention will be described with respect to individual elements thereof.

[1] Negative Electrode

A negative electrode is prepared by, for example, binding a negative electrode active material to a negative electrode collector by a binder for negative electrode so as to form a negative electrode active material layer on the collector. The negative electrode active material layer can be prepared by, for example, slurrying the negative electrode active material, the binder, and various assistant agents if necessary, in a solvent to form a coating liquid, and then applying the obtained coating liquid onto the collector and drying it.

The negative electrode active material of the present embodiment contains a metal alloyable with lithium, and/or a metal oxide capable of intercalating/deintercalating lithium ions.

Examples of the metal alloyable with lithium include Al, Si, Pb, Sn, In, Bi, Ag, Ba, Ca, Hg, Pd, Pt, Te, Zn, La and alloys of two or more of these metals. These metals and alloys may be used in a mixture of two or more. Besides, each of these metals and alloys may contain one or more non-metal elements. As the metal alloyable with lithium used as a negative electrode active material, silicon (simple silicon) is preferred.

Examples of the metal oxide capable of intercalating/deintercalating lithium ions include silicon oxides, aluminum oxides, tin oxides, indium oxides, zinc oxides, lithium oxides and a complex thereof. These metal oxides may be used in combination of two or more. Besides, one or more elements selected from nitrogen, boron and sulfur can be added to the metal oxide in a content of, for example, 0.1 to 5% by mass. As the metal oxide capable of intercalating/deintercalating lithium ions used as a negative electrode active material, silicon oxide is preferred.

Specifically, the negative electrode active material of the present embodiment preferably contains silicon and/or a silicon oxide.

The silicon oxide is not especially limited, and for example, represented by $SiO_x$ ($0<x<2$). The silicon oxide may contain Li, and the silicon oxide containing Li is represented by, for example, $SiLi_yO_z$ ($y>0$ and $2>z>0$). Besides, the silicon oxide may contain a slight amount of a metallic element or a nonmetallic element. The silicon oxide may contain one, two, or more elements selected from the group consisting of, for example, nitrogen, boron and sulfur in a concentration of, for example, 0.1 to 5% by mass. If a slight amount of a metallic element or a nonmetallic element is contained, the electric conductivity of the silicon oxide can be improved. The silicon oxide may be crystalline or amorphous.

The negative electrode active material preferably contains, in addition to the silicon and/or the silicon oxide, a carbon material capable of intercalating and deintercalating lithium ions. The carbon material may be contained in a composite state with the silicon or the silicon oxide. The carbon material has, similarly to the silicon oxide, functions to relax the expansion and contraction of the negative electrode active material itself in repeating charge/discharge, and to secure the connection between silicon portions of the negative electrode active material. Accordingly, if the silicon, the silicon oxide and the carbon material are used together, a better cycle characteristic can be attained.

As the carbon material, graphite, amorphous carbon, diamond-like carbon, a carbon nanotube, or a complex of these materials can be used. Here, graphite with high crystallinity has high electric conductivity and is excellent in adhesion to an electrode collector made of a metal such as copper and in voltage flatness. On the other hand, amorphous carbon with low crystallinity shows comparatively small volume expansion and hence attains a high effect of relaxing the volume expansion of the whole negative electrode, and degradation caused from ununiformity such as a grain boundary or a defect is less likely to occur therein. The content of the carbon material in the negative electrode active material is preferably 2% by mass or more and 50% by mass or less, and more preferably 2% by mass or more and 30% by mass or less.

As a method for preparing the negative electrode active material containing the silicon and the silicon oxide, for example a method including mixing simple silicon with the silicon oxide and sintering the resulting mixture at a high temperature and reduced pressure may be employed. Further, in addition to the above mentioned preparing methods of the negative electrode active material, compositing with carbon may be employed in combination. For example, a coating layer of carbon can be formed around a nucleus of the simple silicon and the silicon oxide by a method of introducing a sintered product of a mixture of simple silicon and a silicon oxide into a gaseous atmosphere of an organic compound under non-oxygen atmosphere at high-temperature, or a method of mixing a sintered product of a mixture of simple silicon and a silicon oxide with a carbon precursor resin under non-oxygen atmosphere at high-temperature. In this manner, effects to inhibit the volume expansion through the charge/discharge cycle and to further improve the cycle characteristic can be attained.

If silicon is used as the negative electrode active material of the present embodiment, the negative electrode active material is preferably a complex containing silicon, a silicon oxide and a carbon material (hereinafter also referred to as the Si/SiO/C complex).

The whole or a part of the silicon oxide preferably has an amorphous structure. A silicon oxide having an amorphous structure can inhibit the volume expansion of the carbon material and the silicon, which are used as other components of the negative electrode active material. This mechanism has not been clarified yet, but it is presumed that a silicon oxide having an amorphous structure somehow affects the formation of a coating on an interface between the carbon material and the electrolyte solution. In addition, it seems that an amorphous structure includes a comparatively small number of factors derived from ununiformity such as a grain boundary or a defect. Incidentally, it can be confirmed by X-ray diffraction measurement (such as general XRD measurement) that the whole or a part of the silicon oxide has an amorphous structure. Specifically, if a silicon oxide does not have an amorphous structure, a peak characteristic to the silicon oxide is observed, but if the whole or a part of the silicon oxide has an amorphous structure, the peak characteristic to the silicon oxide is observed as a broad peak.

In the Si/SiO/C complex, the whole or a part of the silicon is preferably dispersed in the silicon oxide. By dispersing at least a part of the silicon in the silicon oxide, the volume expansion of the whole negative electrode can be more inhibited, and the decomposition of the electrolyte solution can be also inhibited. Incidentally, it can be confirmed by observation with a combination of a transmission electron microscope (general TEM observation) and energy dispersive X-ray spectroscopy (general EDX measurement) that the whole or a part of the silicon is dispersed in the silicon oxide. Specifically, a cross-section of a sample is observed, and the oxygen concentration in a silicon portion dispersed in the silicon oxide is measured, so as to confirm that the silicon portion is not an oxide.

In the Si/SiO/C complex, for example, the whole or a part of the silicon oxide has an amorphous structure, and the whole or a part of the silicon is dispersed in the silicon oxide. Such a Si/SiO/C complex can be prepared by, for example, a method disclosed in Japanese Patent Laid-Open No. 2004-47404. Specifically, the Si/SiO/C complex can be obtained, for example, by subjecting a silicon oxide to a CVD treatment under an atmosphere containing an organic gas such as a methane gas. The Si/SiO/C complex obtained by this method is in such a form that surfaces of particles of the silicon oxide containing silicon are coated with carbon. In addition, the silicon is present in the form of nanoclusters in the silicon oxide.

In the Si/SiO/C complex, the ratio among the silicon, the silicon oxide and the carbon material is not especially limited. The silicon is contained in the Si/SiO/C complex in a percentage of preferably 5% by mass or more and 90% by mass or less, and more preferably 20% by mass or more and 50% by mass or less. The silicon oxide is contained in the Si/SiO/C complex in a percentage of preferably 5% by mass or more and 90% by mass or less, and more preferably 40% by mass or more and 70% by mass or less. The carbon material is contained in the Si/SiO/C complex in a percentage of preferably 2% by mass or more and 50% by mass or less, and more preferably 2% by mass or more and 30% by mass or less.

Furthermore, the Si/SiO/C complex may be a mixture of simple silicon, a silicon oxide and a carbon material, and can be prepared also by mixing simple silicon, a silicon oxide and a carbon material by using a mechanical milling. For example, the Si/SiO/C complex can be obtained by mixing simple silicon, a silicon oxide and a carbon material all in the form of particles.

The average particle size of the simple silicon can be set, for example, to be smaller than the average particle size of the carbon material and the average particle size of the silicon oxide. In this manner, the simple silicon, which largely changes in the volume upon the charge/discharge cycle, has a relatively smaller particle size, and the carbon material and the silicon oxide, which changes a little in the volume, have relatively larger particle sizes. Therefore, generation of dendrite and generation of fine powders of the alloy can be more effectively inhibited. Besides, in a charging/discharging process, lithium intercalates/deintercalates into the particles in the order of the particles having a large size, the particles having a small size and the particles having a large size. Also from this point of view, occurrence of residual stress and residual strain can be suppressed. The average particle size of the simple silicon can be, for example, 20 μm or less and preferably 15 μm or less. Besides, the average particle size of the silicon oxide is preferably equal to or smaller than ½ of the average particle size of the carbon material, and the average particle size of the simple silicon is preferably equal to or smaller than ½ of the average particle size of the silicon oxide. Furthermore, it is more preferable that the average particle size of the silicon oxide is equal to or smaller than ½ of the average particle size of the carbon material and that the average particle size of the simple silicon is equal to or smaller than ½ of the average particle size of the silicon oxide. By controlling the average particle sizes to fall in these ranges, the effect of relaxing the volume expansion can be more effectively attained, and a secondary battery excellent in balance between the energy density and the cycle life and efficiency can be obtained. More specifically, it is preferred that the average particle size of the silicon oxide is equal to or smaller than ½ of the average particle size of graphite and that the average particle size of the simple silicon is equal to or smaller than ½ of the average particle size of the silicon oxide. Furthermore specifically, the average particle size of the simple silicon can be, for example, 20 μm or less and is preferably 15 μm or less.

In addition, a substance obtained by treating the surface of the above described Si/SiO/C complex with a silane coupling agent may be used as the negative electrode active material.

The binder for negative electrode is not especially limited, and polyvinylidene fluoride, vinylidene fluoride-hexafluoropropylene copolymer, vinylidene fluoride-tetrafluoroethylene copolymer, styrene-butadiene copolymer rubber, polytetrafluoroethylene, polypropylene, polyethylene, polyimide, polyamide-imide or the like can be used. Among these, polyimide, polyamide-imide, polyacrylic acids (including a lithium salt, a sodium salt and a potassium salt neutralized with an alkali), and carboxymethyl celluloses (including a lithium salt, a sodium salt and a potassium salt neutralized with an alkali) are preferably used because strong adhesion can be attained by them. The amount of the binder for negative electrode to be used is preferably 5 to 25 parts by mass based on 100 parts by mass of the negative electrode active material from the viewpoint of a trade-off relationship between "sufficient binding force" and "high energy".

As the material of the negative electrode collector, any of known materials may be arbitrarily used, and for example, a metal material such as copper, nickel or SUS is used. In particular, copper is particularly preferable from the viewpoint of workability and cost. The electrode collector is preferably precedently subjected to a surface-roughening treatment. Furthermore, the shape of the collector is also arbitrary, including a foil shape, a plate shape, a mesh shape and the like. In addition, a perforated-type collector such as an expanded metal or a punching metal can also be used. Besides, preferable thickness and shape to be employed when using a thin film as the collector are also arbitrary.

The negative electrode can be prepared, for example, by forming a negative electrode active material layer containing the negative electrode active material and the binder for negative electrode on the negative electrode collector. The negative electrode active material layer can be formed by, for example, a doctor blade method, a die coater method, a CVD method, or a sputtering method. Alternatively, after precedently forming the negative electrode active material layer, a thin film of aluminum, nickel or an alloy of them may be formed thereon by vapor deposition, sputtering or the like to be used as the negative electrode collector.

[2] Positive Electrode

A positive electrode is in a form in which, for example, a positive electrode active material is bound by a binder for positive electrode so as to cover a positive electrode collector.

Examples of the positive electrode active material include lithium manganese having a layered structure or a spinel structure such as $LiMnO_2$ or $Li_xMn_2O_4$ ($0<x<2$); $LiCoO_2$, $LiNiO_2$ or a substance in which a part of a transition metal of these is substituted with another metal; lithium transition metal oxides in which specific transition metals occupy less than a half of the whole structure such as $LiNi_{1/3}Co_{1/3}Mn_{1/3}O_2$; and substances containing Li more excessively than in a stoichiometric composition in the above lithium transition metal oxides. In particular, $Li_\alpha Ni_\beta Co_\gamma Al_\delta O_2$ ($1\le\alpha\le1.2$, $\beta+\gamma+\delta=1$, $\beta\ge0.7$ and $\gamma\le0.2$), or $Li_\alpha Ni_\beta Co_\gamma Mn_\delta O_2$ ($1\le\alpha\le1.2$, $\beta+\gamma+\delta=1$, $\beta\ge0.6$ and $\gamma$ 0.2) is preferable. These positive electrode active materials may be used singly, or in combination of two or more.

As the binder for positive electrode, any of those mentioned as the binder for negative electrode can be used. In particular, from the viewpoint of general-purpose and low cost, polyvinylidene fluoride is preferably used. The amount of the binder for positive electrode to be used is preferably 2 to 10 parts by mass based on 100 parts by mass of the positive electrode active material from the viewpoint of the trade-off relationship between "sufficient binding force" and "high energy".

As the positive electrode collector, any of those mentioned as the negative electrode collector can be used.

To a positive electrode active material layer containing the positive electrode active material, a conductive assistant may be added for purpose of lowering impedance. Examples of the conductive assistant include carbonaceous fine particles such as graphite, carbon black and acetylene black.

[3] Electrolyte Solution

The electrolyte solution of the present embodiment is a nonaqueous electrolyte solution comprising an electrolyte salt dissolved in a nonaqueous solvent. The electrolyte solution of the present embodiment comprises a carbonyl compound represented by the following formula (1):

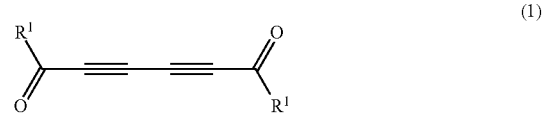

(1)

wherein two $R^1$s may be the same or different from each other, and each independently represents hydrogen atom, substituted or unsubstituted alkyl group, cycloalkyl group, alkenyl group, alkynyl group, substituted or unsubstituted aromatic group, oxyalkylene group represented by the following formula (2):

$$—(R^{21}O)_n—R^{22} \quad (2)$$

wherein $R^{21}$ represents alkylene group having 1 to 6 carbon atoms, $R^{22}$ represents hydrocarbon group having 1 to 12 carbon atoms, and n represents an integer of 1 to 10, substituted or unsubstituted alkoxy group, cycloalkyloxy group, alkenyloxy group, alkynyloxy group, substituted or unsubstituted aromatic oxy group, or oxyalkyleneoxy group represented by the following formula (2b):

$$—O—(R^{21}O)_n—R^{22} \quad (2b)$$

wherein $R^{21}$ represents alkylene group having 1 to 6 carbon atoms, $R^{22}$ represents hydrocarbon group having 1 to 12 carbon atoms, and n represents an integer of 1 to 10.

If $R^1$ represents unsubstituted alkyl group, the alkyl group may be linear or branched, and has preferably 1 to 12 carbon atoms and more preferably 1 to 6 carbon atoms, and examples thereof include methyl, ethyl, propyl, isopropyl, n-butyl, t-butyl and n-hexyl.

If $R^1$ represents substituted alkyl group, the alkyl group has preferably 1 to 18 carbon atoms, more preferably 1 to 12 carbon atoms, further preferably 1 to 8 carbon atoms, and most preferably 1 to 6 carbon atoms. Preferable examples of the substituent include —$NR^{11}R^{12}$, halogen and —CN, wherein $R^{11}$ and $R^{12}$ each independently represent H or alkyl group having 1 to 6 carbon atoms, preferably 1 to 4 carbon atoms. At least one of $R^{11}$ and $R^{12}$ is preferably alkyl group, and more preferably both of $R^{11}$ and $R^{12}$ are alkyl groups. It should be noted that the number of the carbon atoms of $R^{11}$ and $R^{12}$ are not included in the number of carbon atoms of the alkyl group mentioned above, but it is also preferable that the number of carbon atoms of $R^{11}$ and $R^{12}$ are counted to be included in the aforementioned number of carbon atoms.

Examples of the halogen as the substituent include fluorine, chlorine, bromine and iodine. The halogen is preferably fluorine, chlorine or bromine, more preferably fluorine or chlorine, and particularly preferably fluorine. Neither the number of substitution with the halogen nor the substitution position thereof is especially limited, but at least monosubstitution, preferably disubstitution or trisubstitution, at the end of the alkyl group, is preferable.

If the substituent is —CN, the substitution position is also not especially limited, but substitution at the end of the alkyl group is preferable.

Specific examples of the alkyl group having —$NR^{11}R^{12}$ as the substituent, namely, examples of amino alkyl group, include N,N-diethylaminobutyl, N,N-diethylaminopropyl, N,N-diethylaminoethyl, N,N-diethylaminomethyl, N,N-dimethylaminobutyl, N,N-dimethylaminopropyl, N,N-dimethylaminoethyl, N,N-dimethylaminomethyl, and N-methylaminomethyl.

Examples of the alkyl group having halogen as the substituent, namely, examples of haloalkyl group, include fluoroalkyl group (such as —$CF_2CF_3$, —$CF_2CF_2H$, —$CFHCF_3$, —$CH_2CF_3$, —$CHFCF_2H$, —$CH_2CF_2H$, —$CH_2CFH_2$, —$CH_2CH_2CF_3$, —$CH_2CFHCF_3$, —$CH_2CF_2CF_3$, —$CH_2CH_2CH_2CF_3$), chloroalkyl group (such as chlorobutyl, chloropropyl, chloroethyl or chloromethyl), and bromoalkyl group (such as bromobutyl, bromopropyl, bromoethyl or bromomethyl).

Examples of the alkyl group having —CN as the substituent, namely, examples of cyanoalkyl group, include cyanoethyl, cyanopropyl, cyanobutyl, cyanopentyl and cyanohexyl.

If $R^1$ is cycloalkyl group, the cycloalkyl group preferably has 3 to 12 carbon atoms, more preferably 3 to 6 carbon atoms, and specific examples thereof include cyclopropyl, cyclobutyl, cyclopentyl and cyclohexyl.

If $R^1$ is alkenyl group, the alkenyl group preferably has 2 to 12 carbon atoms, more preferably 2 to 6 carbon atoms, and examples thereof include vinyl, 1-propenyl, 2-propenyl and 2-butenyl.

If $R^1$ is alkynyl group, the alkynyl group preferably has 2 to 12 carbon atoms, more preferably 2 to 6 carbon atoms, and examples thereof include acetylenyl, 1-propynyl, 2-propynyl and 2-butynyl.

If $R^1$ is substituted or unsubstituted aromatic group, for example, the aromatic group is preferably aryl group, arylalkyl group or alkylaryl group, and has preferably 6 to 18 carbon atoms, and more preferably 6 to 12 carbon atoms. The aromatic group may either be unsubstituted or have a substituent, and if the aromatic group has a substituent, it preferably has, as a substituent on an aromatic ring, —CN, halogen such as fluorine or chlorine (particularly preferably fluorine) or others. Specific examples of substituted or unsubstituted aromatic group include phenyl, cyanophenyl, fluorophenyl, difluorophenyl, trifluorophenyl, cyanofluorophenyl, cyanodifluorophenyl; benzyl (=phenyl methyl group), cyanophenyl methyl, fluorophenyl methyl, difluorophenyl methyl, trifluorophenyl methyl, cyanofluorophenyl methyl, cyanodifluorophenyl methyl; 2-phenylethyl, cyano-2-phenylethyl, fluoro-2-phenylethyl, difluoro-2-phenylethyl, trifluoro-2-phenylethyl, cyanofluoro-2-phenylethyl, and cyanodifluoro-2-phenylethyl. The substitution by a cyano group or halogen such as fluorine may take place at any arbitrary position on the aromatic ring.

If $R^1$ is an oxyalkylene group represented by the above formula (2), $R^{21}$ represents alkylene group having 1 to 6 carbon atoms, preferably 2 to 4 carbon atoms, and more preferably represents ethylene or propylene, and particularly preferably ethylene;

$R^{22}$ represents alkyl group having 1 to 12 carbon atoms, preferably 1 to 7 carbon atoms, or aryl group having 6 to 12 carbon atoms, and particularly preferably represents linear alkyl group having 1 to 7 carbon atoms; and n is an integer of 1 to 10, and preferably 1 to 4.

Examples of the moiety of —$(R^{21}O)_n$—, namely, a moiety of (poly)oxyalkylene, include oxyethylene (=ethylene oxide group), dioxyethylene (=diethylene oxide group), trioxyethylene (=triethylene oxide group), tetraoxyethylene (=tetraethylene oxide group), oxypropylene (=propylene oxide group), dioxypropylene (=dipropylene oxide group), trioxypropylene (=tripropylene oxide group), and tetraoxypropylene (=tetrapropylene oxide group). The alkylene structure of $R^{21}$ may be bonded at an arbitrary position as in propane-1,2-diyl, propane-1,3-diyl or the like.

If $R^1$ is unsubstituted alkoxy group, the alkoxy group may be linear or branched, and has preferably 1 to 12 carbon atoms, more preferably 1 to 6 carbon atoms, and examples thereof include methoxy, ethoxy, propoxy group, isopropoxy group, n-butoxy group, t-butoxy group and n-hexoxy group. Besides, alkoxy group having 7 to 12 carbon atoms may also be preferably used.

If $R^1$ is substituted alkoxy group, the substituted alkoxy group is preferably represented by —O—$R^{2b}$ in which $R^{2b}$ represents the above "substituted alkyl group". Namely, the substituted alkoxy group has preferably 1 to 18, more preferably 1 to 12, furthermore preferably 1 to 8, and most preferably 1 to 6 carbon atoms, and the substituent is preferably —$NR^{11}R^{12}$, halogen or —CN. Here, $R^{11}$ and $R^{12}$ each independently represent H or alkyl group having 1 to 6 carbon atoms, preferably 1 to 4 carbon atoms. Preferably, at least one of $R^{11}$ and $R^{12}$ is alkyl group, and more preferably, both of them are alkyl groups. It should be noted that the number of carbon atoms of $R^{11}$ and $R^{12}$ are not included in the number of carbon atoms of the alkoxy group mentioned above, but it is also preferable that the number of carbon atoms of $R^{11}$ and $R^{12}$ are counted to be included in the aforementioned number of carbon atoms.

Examples of the halogen as the substituent include fluorine, chlorine, bromine and iodine, and the halogen is preferably fluorine, chlorine or bromine, more preferably fluorine or chlorine, and particularly preferably fluorine. Neither the number of substitution with the halogen nor the substitution position is especially limited, but at least monosubstitution, particularly disubstitution or trisubstitution, at the end of the alkyl group, is preferable.

If the substituent is —CN, the substitution position of —CN is also not especially limited, but substitution at the end of the alkyl group is preferable.

Specific examples of the alkoxy group having —$NR^{11}R^{12}$ as the substituent, namely, examples of amino alkoxy group, can include N,N-diethylaminobutoxy, N,N-diethylaminopropoxy, N,N-diethylaminoethoxy, N,N-diethylaminomethoxy, N,N-dimethylaminobutoxy, N,N-dimethylaminopropoxy, N,N-dimethylaminoethoxy, N,N-dimethylaminomethoxy, and N-methylaminomethoxy.

Examples of the alkoxy group having halogen as the substituent, namely, examples of haloalkoxy group, can include fluoroalkoxy group (such as —$OCF_2CF_3$, —$OCF_2CF_2H$, —$OCFHCF_3$, —$OCH_2CF_3$, —$OCHFCF_2H$, —$OCH_2CF_2H$, —$OCH_2CFH_2$, —$OCH_2CH_2CF_3$, —OCH$_2$CFHCF$_3$, —OCH$_2$CF$_2$CF$_3$, —OCH$_2$CH$_2$CH$_2$CF$_3$), chloroalkoxy group (such as chlorobutoxy, chloropropoxy, chloroethoxy or chloromethoxy), and bromoalkoxy group (such as bromobutoxy, bromopropoxy, bromoethoxy or bromomethoxy).

Examples of the alkoxy group having —CN as the substituent, namely, examples of cyanoalkoxy group, include cyanoethoxy, cyanopropoxy, cyanobutoxy, cyanopentoxy and cyanohexoxy.

If R$^1$ is cycloalkyloxy group, the cycloalkyloxy group preferably has 3 to 12 carbon atoms, more preferably 3 to 6 carbon atoms, and specific examples thereof include cyclopropyloxy, cyclobutyloxy, cyclopentyloxy and cyclohexyloxy.

If R$^1$ is alkenyloxy group, the alkenyloxy group preferably has 2 to 12 carbon atoms, more preferably 2 to 6 carbon atoms, and examples thereof include vinyloxy, 1-propenyloxy, 2-propenyloxy and 2-butenyloxy.

If R$^1$ is alkynyloxy group, the alkynyloxy group preferably has 2 to 12 carbon atoms, more preferably 2 to 6 carbon atoms, and examples thereof include acetylenyloxy, 1-propynyloxy, 2-propynyloxy and 2-butynyloxy.

If R$^1$ is substituted or unsubstituted aromatic oxy group, for example, the aromatic oxy group is preferably aryloxy group, arylalkoxy group or alkylaryloxy group, and has preferably 6 to 18 carbon atoms, and more preferably 6 to 12 carbon atoms. The aromatic oxy group may be unsubstituted or may have a substituent, and if the aromatic oxy group has a substituent, it preferably has, as the substituent on an aromatic ring, —CN, halogen such as fluorine or chlorine (particularly preferably fluorine) or the like. Specific examples of substituted or unsubstituted aromatic oxy group include phenoxy, cyanophenoxy, fluorophenoxy, difluorophenoxy, trifluorophenoxy, cyanofluorophenoxy, cyano difluorophenoxy; benzyloxy (=phenyl methoxy group), cyanophenyl methoxy, fluorophenyl methoxy, difluorophenyl methoxy, trifluorophenyl methoxy, cyanofluorophenyl methoxy, cyanodifluorophenyl methoxy; 2-phenylethoxy, cyano-2-phenylethoxy, fluoro-2-phenylethoxy, difluoro-2-phenylethoxy, trifluoro-2-phenylethoxy, cyanofluoro-2-phenylethoxy, and cyanodifluoro-2-phenylethoxy. The substitution by a cyano group or halogen such as fluorine may take place at any arbitrary position on the aromatic ring.

If R$^1$ is oxyalkyleneoxy group represented by the above formula (2b),

R$^{21}$ represents alkylene group having 1 to 6 carbon atoms, preferably 2 to 4 carbon atoms, more preferably represents ethylene or propylene, and particularly preferably represents ethylene;

R$^{22}$ represents alkyl group having 1 to 12 carbon atoms, preferably 1 to 7 carbon atoms, or aryl group having 6 to 12 carbon atoms, and particularly preferably represents linear alkyl group having 1 to 7 carbon atoms; and n is an integer of 1 to 10, and preferably 1 to 4.

Examples of the moiety of —(R$^{21}$O)$_n$—, namely, a moiety of (poly)oxyalkylene, include oxyethylene (=ethylene oxide group), dioxyethylene (=diethylene oxide group), trioxyethylene (=triethylene oxide group), tetraoxyethylene (=tetraethylene oxide group), oxypropylene (=propylene oxide group), dioxypropylene (=dipropylene oxide group), trioxypropylene (=tripropylene oxide group), and tetraoxypropylene (=tetrapropylene oxide group). The alkylene structure of R$^{21}$ may be bound in an arbitrary position as in propane-1,2-diyl, propane-1,3-diyl or the like.

Particularly, the carbonyl compound of formula (1) is preferably a compound in which two R$^1$s of formula (1) each independently represent a group selected from:

unsubstituted alkoxy group having 1 to 12 carbon atoms;

substituted alkoxy group selected from the group consisting of fluoroalkoxy group, amino alkoxy group having a substituent —NR$^{11}$R$^{12}$ (wherein R$^{11}$ and R$^{12}$ each independently represent H or alkyl group having 1 to 6 carbon atoms), and cyanoalkoxy group;

substituted or unsubstituted aromatic oxy group selected from the group consisting of aryloxy group, arylalkyloxy group and alkylaryloxy group, which optionally has —CN or halogen as a substituent on the aromatic ring; and oxyalkyleneoxy group represented by the following formula (2b):

$$-O-(R^{21}O)_n-R^{22} \quad (2b)$$

wherein R$^{21}$ represents alkylene group having 1 to 6 carbon atoms, R$^{22}$ represents hydrocarbon group having 1 to 12 carbon atoms, and n represents an integer of 1 to 10.

Accordingly, as the carbonyl compound of formula (1), a compound represented by the following formula (3) is preferable:

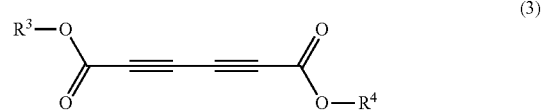

(3)

wherein, as for R$^3$ and R$^4$, R$^3$O— and R$^4$O— each represent the unsubstituted alkoxy group, the substituted alkoxy group, the substituted or unsubstituted aromatic oxy group or the oxyalkyleneoxy group mentioned above as the preferable R$^1$. More preferable examples of these groups are mentioned above for each of them.

Examples of the carbonyl compound used in the present invention include the following compounds:

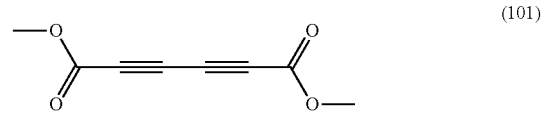

(101)

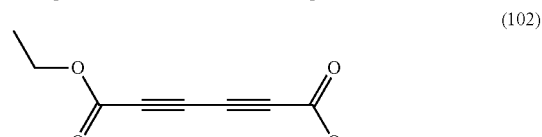

(102)

(103)

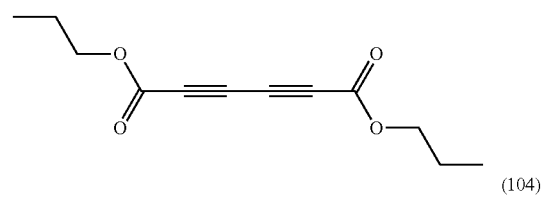

(104)

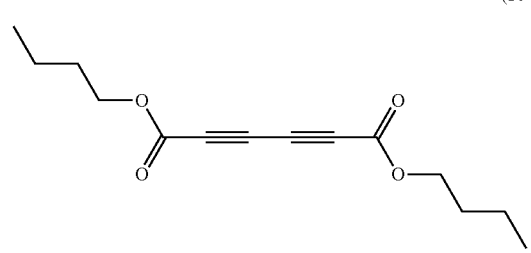

(105) 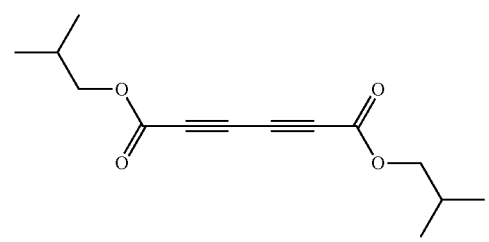
(106) 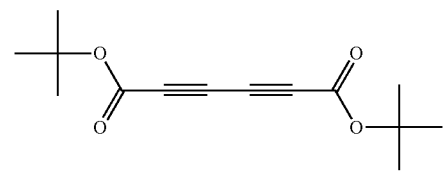
(107) 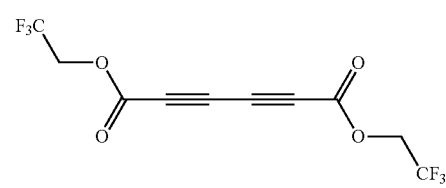
(108) 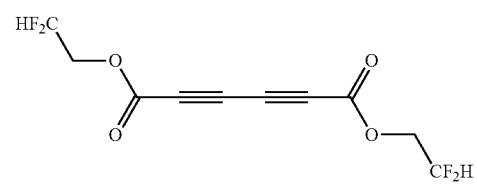
(109) 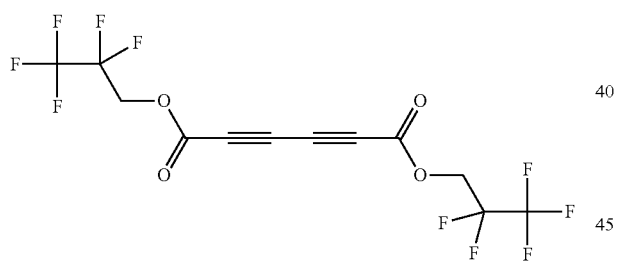
(110) 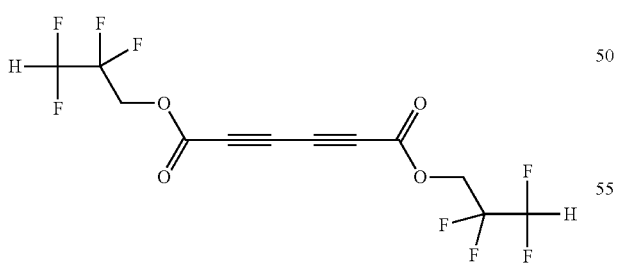
(111) 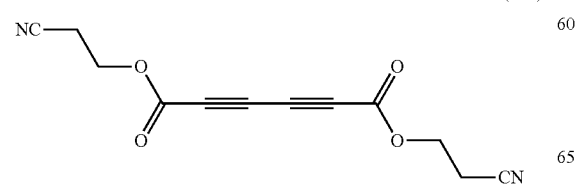
(112) 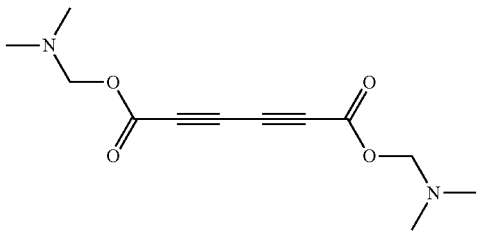
(113) 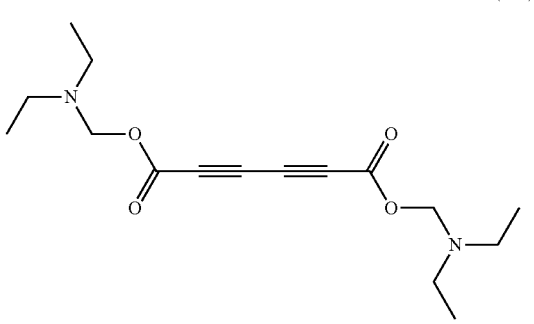
(114) 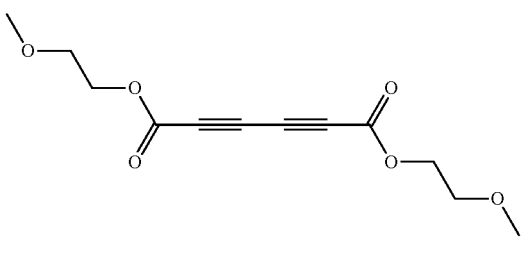
(115) 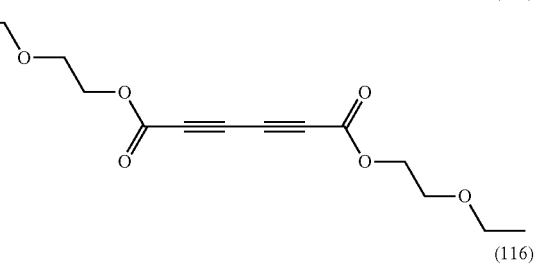
(116) 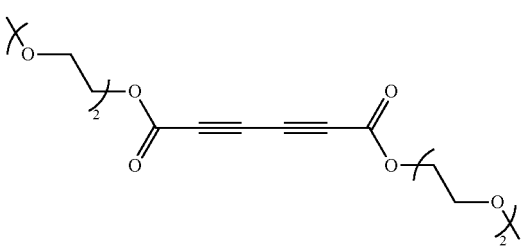
(117) 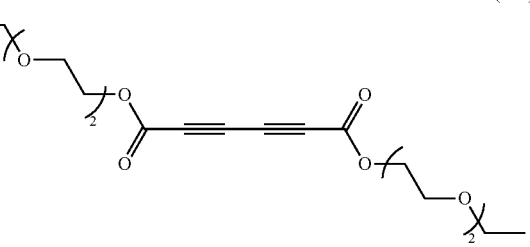

(118)
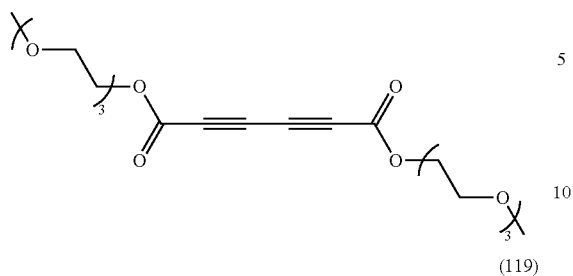
(119)
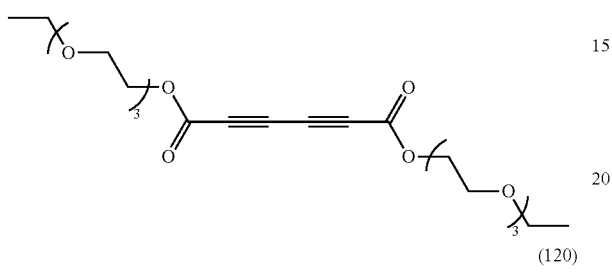
(120)
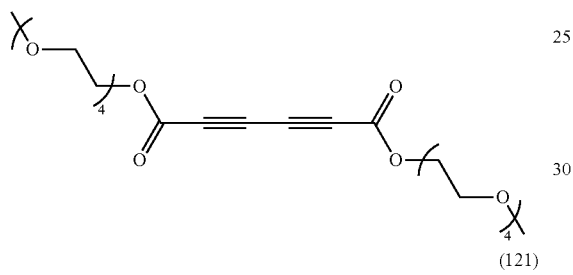
(121)
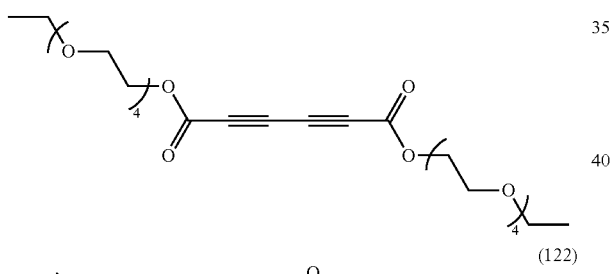
(122)
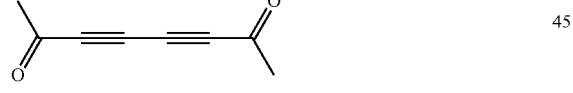
(123)
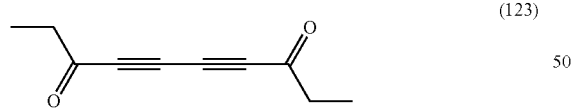
(124)
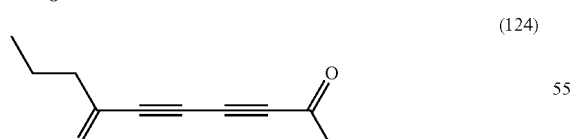
(125)
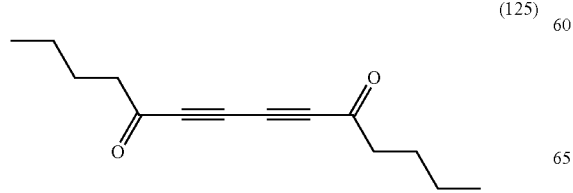
(126)
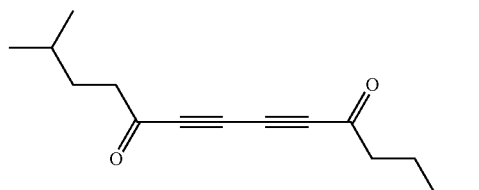
(127)
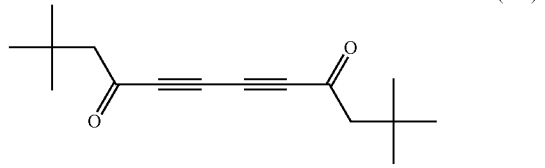
(128)
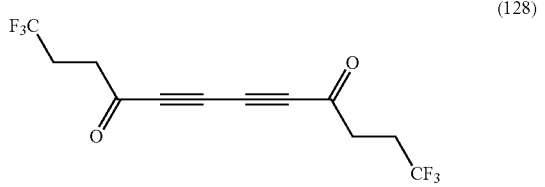
(129)
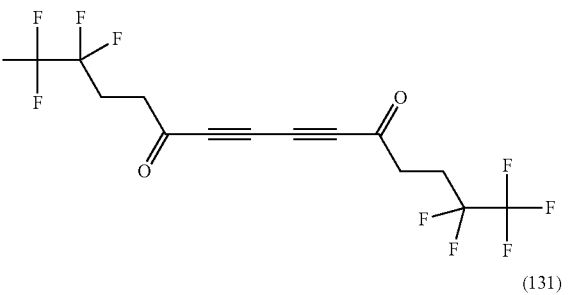
(130)
(131)
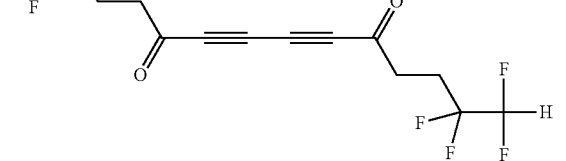
(132)
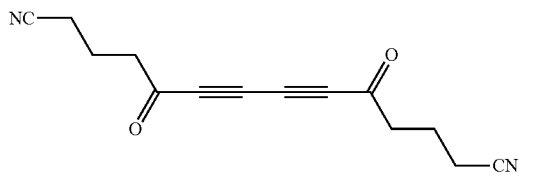

-continued

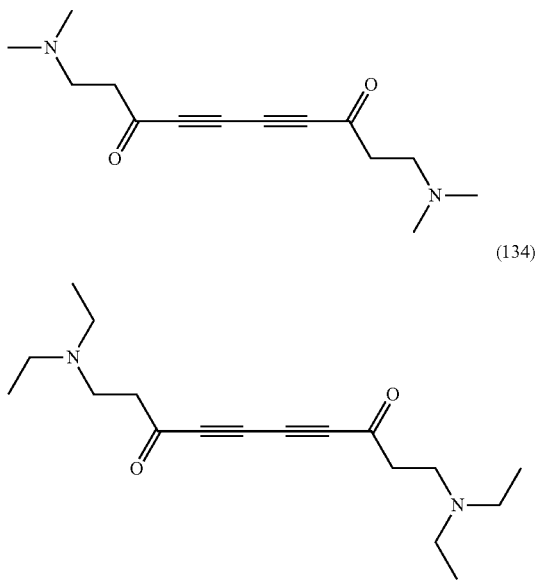

(133)

(134)

The carbonyl compound used in the present invention can be synthesized by a coupling reaction such as a Glaser reaction (or a Glaser coupling reaction) using acetylene and copper, an Eglinton coupling reaction or a Hay coupling reaction.

An example of a synthetic route to the carbonyl compound used in the present invention is shown as a synthetic scheme represented by the following formula (6):

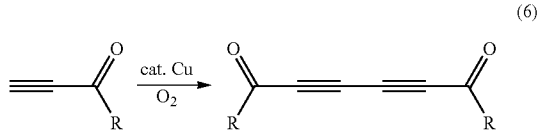

(6)

wherein R has the same meaning as defined above for $R^1$ of formula (1).

Specifically, the compound can be synthesized by a method in which two molecules of substituted acetylene are coupled in the presence of a catalytic amount of copper. As the copper working as a catalyst, a monovalent copper such as copper(I) chloride, copper(I) bromide or copper(I) iodide, or a bivalent copper such as copper(II) acetate can be used. As a ligand to be added to the catalyst, a nitrogen-based ligand such as bipyridyl, phenanthroline or tetramethylethylenediamine (TMEDA), or a phosphorus-based ligand such as triphenylphosphine, tri(t-butylphosphine), tricyclohexylphosphine, (diphenylphosphino)ethane (dppe), (diphenylphosphino)propane (dppp) or (diphenylphosphino)butane (dppb) can be used. As a solvent, in addition to a general organic solvent such as tetrahydrofuran, dioxane, dimethylformamide, dimethyl sulfoxide, chloroform, dichloromethane or dichloroethane, a basic solvent such as pyridine or triethylamine can be used.

In the present invention, a content of the carbonyl compound of the formula (1) in the electrolyte solution is, for example, 0.01 to 10% by mass, preferably 0.1% by mass or more, and preferably 4% by mass or less, and more preferably 2% by mass or less.

The electrolyte solution used in the present embodiment is, as described above, a nonaqueous electrolyte solution stable at the operation potential of a battery, and contains an electrolyte salt (a supporting electrolyte) dissolved in a nonaqueous solvent.

Specific examples of the nonaqueous solvent include aprotic organic solvents like cyclic carbonates such as propylene carbonate (PC), ethylene carbonate (EC), fluoroethylene carbonate (FEC), t-difluoroethylene carbonate (t-DFEC), butylene carbonate (BC), vinylene carbonate (VC) and vinyl ethylene carbonate (VEC); chain carbonates such as allyl methyl carbonate (AMC), dimethyl carbonate (DMC), diethyl carbonate (DEC), ethyl methyl carbonate (EMC) and dipropyl carbonate (DPC); propylene carbonate derivatives; aliphatic carboxylates such as methyl formate, methyl acetate and ethyl propionate; and cyclic esters such as γ-butyrolactone (GBL). The nonaqueous solvent may be used singly, or in combination of two or more. Moreover, a sulfur-containing cyclic compound such as sulfolane, fluorinated sulfolane, propane sultone or propene sultone can be used.

The electrolyte solution preferably further contains a fluorinated ether compound. A fluorinated ether compound has high affinity with an alloy-based negative electrode such as silicon or tin, and by adding it to the electrolyte solution, the cycle characteristic (particularly, the capacity retention) of a secondary battery can be improved. The fluorinated ether compound may be a fluorinated chain ether compound having a structure in which a part of hydrogen of a non-fluorinated chain ether compound is substituted with fluorine, or a fluorinated cyclic ether compound having a structure in which a part of hydrogen of a non-fluorinated cyclic ether compound is substituted with fluorine.

Examples of the non-fluorinated chain ether compound include non-fluorinated chain monoether compounds such as dimethyl ether, methyl ethyl ether, diethyl ether, methyl propyl ether, ethyl propyl ether, dipropyl ether, methyl butyl ether, ethyl butyl ether, propyl butyl ether, dibutyl ether, methyl pentyl ether, ethyl pentyl ether, propyl pentyl ether, butyl pentyl ether and dipentyl ether; and non-fluorinated chain diether compounds such as 1,2-dimethoxyethane (DME), 1,2-diethoxyethane (DEE), ethoxymethoxyethane (EME), 1,2-dipropoxyethane, propoxyethoxyethane, propoxymethoxyethane, 1,2-dibutoxyethane, butoxypropoxyethane, butoxyethoxyethane, butoxymethoxyethane, 1,2-dipentoxyethane, pentoxybutoxyethane, pentoxypropoxyethane, pentoxyethoxyethane and pentoxymethoxyethane.

Examples of the non-fluorinated cyclic ether compound include non-fluorinated cyclic monoether compounds such as ethylene oxide, propylene oxide, oxetane, tetrahydrofuran, 2-methyl tetrahydrofuran, 3-methyl tetrahydrofuran, tetrahydropyran, 2-methyl tetrahydropyran, 3-methyl tetrahydropyran and 4-methyl tetrahydropyran; and non-fluorinated cyclic diether compounds such as 1,3-dioxolane, 2-methyl-1,3-dioxolane, 4-methyl-1,3-dioxolane, 1,4-dioxane, 2-methyl-1,4-dioxane, 1,3-dioxane, 2-methyl-1,3-dioxane, 4-methyl-1,3-dioxane, 5-methyl-1,3-dioxane, 2,4-dimethyl-1,3-dioxane and 4-ethyl-1,3-dioxane.

The fluorinated chain ether compound is preferably a compound represented by the following formula (7):

(7)

In formula (7), $R_a$ and $R_b$ each independently represent alkyl group or fluorine-substituted alkyl group, and at least one of $R_a$ and $R_b$ is fluorine-substituted alkyl group.

In each of $R_a$ and $R_b$, the number of carbon atoms of the alkyl group is preferably 1 to 12, more preferably 1 to 8, furthermore preferably 1 to 6, and particularly preferably 1 to 4. Besides, in formula (7), the alkyl group includes a linear, branched or cyclic group, and is preferably a linear group.

At least one of $R_a$ and $R_b$ is fluorine-substituted alkyl group. Fluorine-substituted alkyl group refers to substituted alkyl group having a structure in which at least one hydrogen atom of unsubstituted alkyl group is substituted with a fluorine atom. The fluorine-substituted alkyl group is preferably linear. Moreover, $R_a$ and $R_b$ each independently represent preferably fluorine-substituted alkyl group having 1 to 6 carbon atoms, and more preferably fluorine-substituted alkyl group having 1 to 4 carbon atoms.

From the viewpoint of safety, the fluorinated chain ether compound is more preferably represented by the following formula (8):

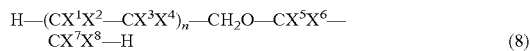

$$H-(CX^1X^2-CX^3X^4)_n-CH_2O-CX^5X^6-CX^7X^8-H \quad (8)$$

In formula (8), n represents 1, 2, 3 or 4, and $X^1$ to $X^8$ each independently represent a fluorine atom or a hydrogen atom. However, at least one of $X^1$ to $X^4$ is a fluorine atom, and at least one of $X^5$ to $X^8$ is a fluorine atom.

In formula (8), each occurrence of $X^1$ to $X^4$ in n times may be independent of one another.

In formula (8), the atomic ratio of fluorine atoms to hydrogen atoms is preferably 1 or more. In other words, a relationship of (total number of fluorine atoms)/(total number of hydrogen atoms) 1 is preferably satisfied.

Moreover, from the viewpoint of safety, the fluorinated chain ether compound is furthermore preferably represented by the following formula (9):

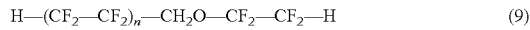

$$H-(CF_2-CF_2)_n-CH_2O-CF_2-CF_2-H \quad (9)$$

In formula (9), n represents 1 or 2.

Examples of the chain fluorinated ether compound include $CF_3OCH_3$, $CF_3OC_2H_6$, $F(CF_2)_2OCH_3$, $F(CF_2)_2OC_2H_5$, $F(CF_2)_3OCH_3$, $F(CF_2)_3OC_2H_5$, $F(CF_2)_4OCH_3$, $F(CF_2)_4OC_2H_5$, $F(CF_2)_5OCH_3$, $F(CF_2)_5OC_2H_5$, $F(CF_2)_8OCH_3$, $F(CF_2)_8OC_2H_5$, $F(CF_2)_9OCH_3$, $CF_3CH_2OCH_3$, $CF_3CH_2OCHF_2$, $CF_3CF_2CH_2OCH_3$, $CF_3CF_2CH_2OCHF_2$, $CF_3CF_2CH_2O(CF_2)_2H$, $CF_3CF_2CH_2O(CF_2)_2F$, $HCF_2CH_2OCH_3$, $H(CF_2)_2OCH_2CH_3$, $H(CF_2)_2OCH_2CF_3$, $H(CF_2)_2CH_2OCHF_2$, $H(CF_2)_2CH_2O(CF_2)_2H$, $H(CF_2)_2CH_2O(CF_2)_3H$, $H(CF_2)_3CH_2O(CF_2)_2H$, $(CF_3)_2CHOCH_3$, $(CF_3)_2CHCF_2OCH_3$, $CF_3CHFCF_2OCH_3$, $CF_3CHFCF_2OCH_2CH_3$, $CF_3CHFCF_2CH_2OCHF_2$.

The content of the fluorinated chain ether compound in the electrolyte solution is, for example, 1 to 70% by mass. The content of the fluorinated chain ether compound in the electrolyte solution is preferably 2 to 60% by mass, more preferably 3 to 55% by mass, and furthermore preferably 4 to 50% by mass. If the content of the fluorinated chain ether compound is 50% by mass or less, Li ion is easily dissociated from a supporting electrolyte, and hence, the conductivity of the electrolyte solution is improved. On the other hand, if the content of the fluorinated chain ether compound is 1% by mass or more, it is believed that the reductive decomposition of the electrolyte solution on the negative electrode can be easily inhibited.

Specific examples of the electrolyte salt (supporting electrolyte) contained in the electrolyte solution include, but are not especially limited to, lithium salts such as $LiPF_6$, $LiAsF_6$, $LiAlCl_4$, $LiClO_4$, $LiBF_4$, $LiSbF_6$, $LiCF_3SO_3$, $LiC_4F_9SO_3$, $Li(CF_3SO_2)_2$, $LiN(CF_3SO_2)_2$. These supporting electrolytes may be used singly, or in combination of two or more. The concentration of the supporting electrolyte is not especially limited, and is, for example, 0.01 mol/L to 3 mol/L.

[4] Separator

A separator is not especially limited, and a porous film or a nonwoven fabric of polypropylene, polyethylene or the like can be used. A separator obtained by laminating such a material may also be used.

[5] Outer Package

An outer package is not especially limited, and for example, a laminated film can be used. Any laminated film can be appropriately selected as long as it is stable against the electrolyte solution and has a sufficient steam barrier property. As the outer package of the laminated film, for example, a laminated film of polypropylene or polyethylene coated with aluminum, silica or alumina can be used. In particular, from the viewpoint of inhibiting the volume expansion, an aluminum laminated film is preferably used.

In the secondary battery using a laminated film as the outer package, the deformation of the electrode element caused when a gas is generated is extremely large as compared with that caused in a secondary battery using a metal can as the outer package. This is because the laminated film is more easily deformed by the internal pressure of the secondary battery than the metal can. Furthermore, when sealing the secondary battery using a laminated film as the outer package, the pressure within the battery is generally decreased to a lower level than the atmospheric pressure, and hence, there remains no spare room within the battery. Therefore, the generation of a gas immediately leads to the volume change of the battery or the deformation of the electrode element in some cases.

In a secondary battery of the present embodiment, these problems can be overcome. As a result, there can be provided a layered laminated type lithium ion secondary battery that is inexpensive, and shows an excellent degree of freedom in design of cell capacity by changing the number of laminated layers.

A typical example of the layered structure of the laminated film is a structure in which a metal thin film layer and a heat-fusible resin layer are laminated. Another typical example of the layered structure of the laminated film is a structure in which a protective layer made of a film of polyester such as polyethylene terephthalate or nylon is further laminated on a surface of the metal thin film layer on the opposite side to the heat-fusible resin layer. When sealing a battery element, the battery element is surrounded with the heat-fusible resin layer opposed. As the metal thin film layer, for example, a foil of Al, Ti, Ti alloy, Fe, stainless steel, Mg alloy or the like having a thickness of 10 to 100 μm is used. A resin used for the heat-fusible resin layer is not especially limited as long as it is fusible with heat. As the heat-fusible resin layer, for example, polypropylene, polyethylene, an acid-modified product of these resins, polyphenylene sulfide, polyester such as polyethylene terephthalate, polyamide, an ethylene-vinyl acetate copolymer, and an ionomer resin obtained by intermolecular-bonding of an ethylene-methacrylic acid copolymer or an ethylene-acrylic acid copolymer with metal ions are used. The thickness of the heat-fusible resin layer is preferably 10 to 200 μm, and more preferably 30 to 100 μm.

[6] Battery Structure

The structure of the secondary battery is not especially limited, and for example, a layered laminated type structure in which an electrode element including a positive electrode and a negative electrode opposing each other, and an electrolyte solution are housed in an outer package can be employed.

FIG. 1 is a schematic cross-sectional view illustrating the structure of an electrode element of a layered laminated type secondary battery. In this electrode element, a plurality of positive electrodes c and a plurality of negative electrode a both having a planar structure are alternately stacked with a separator b sandwiched therebetween. Positive electrode collectors e of the respective positive electrodes c are welded to one another in end portions not covered with a positive electrode active material so as to be electrically connected to one another, and a positive electrode terminal f is further welded to the welded portion. Negative electrode collectors d of the respective negative electrodes are welded to one another in end portions not covered with a negative electrode active material so as to be electrically connected to one another, and a negative electrode terminal g is further welded to the welded portion.

In the electrode element having such a planar layered structure, no portion has small R (like a portion close to a core of a winding structure), and therefore, such an electrode element has an advantage that it is less likely to be harmfully affected by the volume change of the electrode caused through the charge/discharge cycle as compared with an electrode element having a winding structure. In other words, it is advantageously used as an electrode element using an active material with which the volume expansion is liable to occur. On the other hand, since an electrode is bent in an electrode element having a winding structure, the structure is easily warped if the volume change is caused. In particular, if a negative electrode active material that largely changes in the volume through the charge/discharge cycle, such as a silicon oxide, is used, the capacity is largely lowered through the charge/discharge cycle in a secondary battery using an electrode element having a winding structure.

In the electrode element having a planar layered structure, however, if a gas is generated between the electrodes, there arises a problem that the generated gas is liable to stay between the electrodes. This is for the following reason: In the electrode element having a winding structure, tension is applied to the electrodes and hence a distance between the electrodes is difficult to increase, but in the electrode element having a layered structure, a distance between the electrodes is easily increased. This problem becomes particularly conspicuous when an aluminum laminated film is used as the outer package.

In the present invention, since the carbonyl compound represented by the above formula (1) is contained in the electrolyte solution, the aforementioned problem can be solved, and hence, even in a layered laminated type lithium ion secondary battery using a high-energy negative electrode, long-life driving can be achieved.

Accordingly, the secondary battery according to one embodiment of the present invention is a layered laminated type secondary battery comprising an electrode element including a positive electrode and a negative electrode opposing each other, an electrolyte solution, and an outer package housing the electrode element and the electrolyte solution, wherein the negative electrode comprises a negative electrode active material including at least one of a metal alloyable with lithium and a metal oxide capable of intercalating/deintercalating lithium ions, and the negative electrode active material is bound to a negative electrode collector by a binder for negative electrode, and the electrolyte solution comprises a carbonyl compound represented by the above formula (1). It should be noted however that the carbonyl compound represented by the above formula (1) is effectively used in a secondary battery using an electrode element having a winding structure.

EXAMPLES

Now, the present invention will be specifically described with reference to examples, but it should be noted that the present invention is not limited to these examples.

Synthesis Example 1

In accordance with the following synthesis scheme (10), the carbonyl compound represented by the above formula (101) was synthesized.

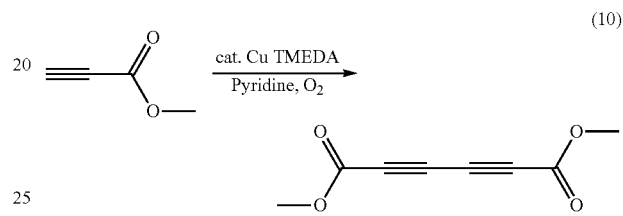

To a 200 mL three-necked flask equipped with a calcium chloride tube, 10 g (118.9 mmol) of methyl propiolate, 10 mol % of a CuCl.TMEDA complex, and 50 mL of pyridine were added under an air atmosphere, and the resultant was stirred with heating at 60° C. for 6 hours. The solvent was distilled off by using an evaporator, and after adding chloroform thereto, the resultant was washed with hydrochloric acid, a sodium hydrogencarbonate aqueous solution and a saturated sodium chloride aqueous solution in this order. The thus obtained organic layer was dried over magnesium sulfate, and the solvent was distilled off by using an evaporator. The resulting mixture was purified by silica gel column chromatography, so as to obtain the compound of the formula (101) in a yield of 54%.

$^1$H NMR (ppm) 3.65 (6H, s)

Synthesis Example 2

The compound of the above formula (107) was obtained in a yield of 47% by substantially the same process performed in the same manner as in Synthesis Example 1 in accordance with the following synthesis scheme (11) except that methyl propiolate was replaced with trifluoroethyl propiolate in an equimolecular amount to methyl propiolate.

$^1$H NMR (ppm) 4.70 (4H, q)

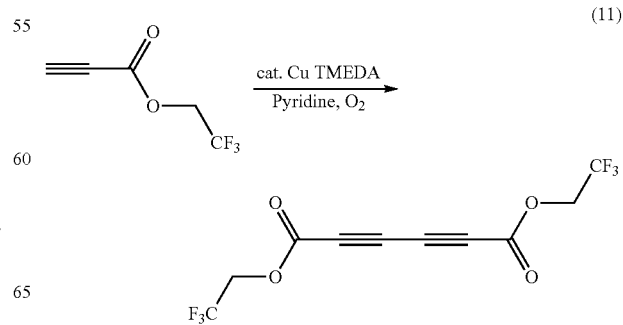

Synthesis Example 3

The compound of the above formula (111) was obtained in a yield of 64% by substantially the same process performed in the same manner as in Synthesis Example 1 in accordance with the following synthesis scheme (12) except that methyl propiolate was replaced with cyanomethyl propiolate in an equimolecular amount to methyl propiolate.

$^1$H NMR (ppm) 5.30 (4H, s)

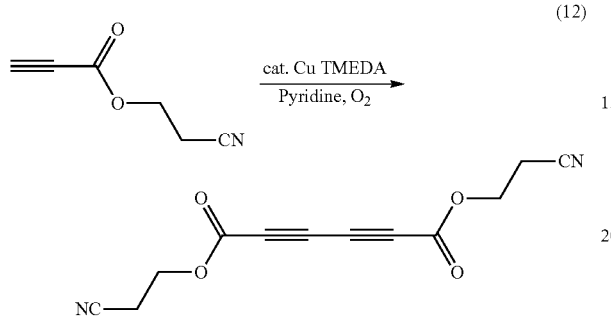

(12)

(Synthesis Example 4)

The compound of the above formula (118) was obtained in a yield of 62% by substantially the same process performed in the same manner as in Synthesis Example 1 in accordance with the following synthesis scheme (13) except that methyl propiolate was replaced with methyl trioxyethyl propiolate in an equimolecular amount to methyl propiolate.

$^1$H NMR (ppm) 3.23 (6H, s), 3.56 (16H, m), 3.68 (4H, m), 4.35 (4H, m)

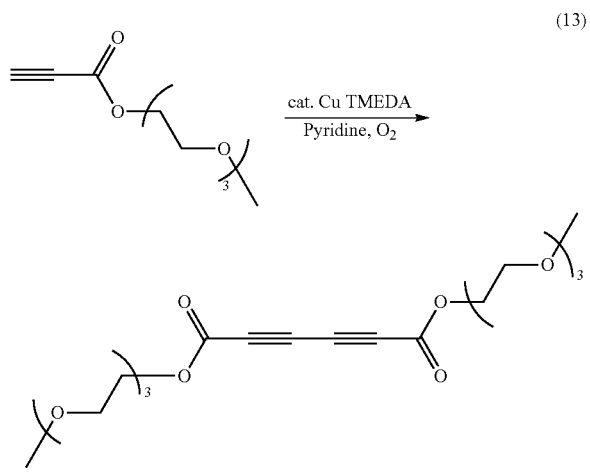

(13)

Synthesis Example 5

The compound of the above formula (119) was obtained in a yield of 46% by substantially the same process performed in the same manner as in Synthesis Example 1 in accordance with the following synthesis scheme (14) except that methyl propiolate was replaced with ethyl trioxyethyl propiolate in an equimolecular amount to methyl propiolate.

$^1$H NMR (ppm) 1.17 (6H, t), 3.39 (4H, s), 3.56 (16H, m), 3.68 (4H, m), 4.35 (4H, m)

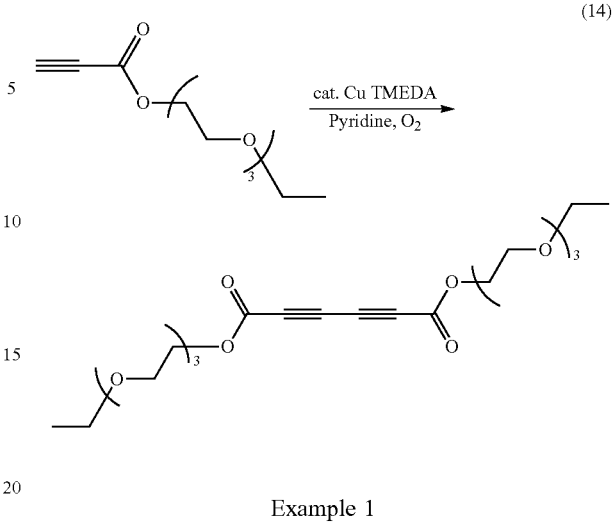

(14)

Example 1

Simple silicon having an average particle size of 5 μm as silicon, and graphite having an average particle size of 30 μm as a carbon material were weighed in a mass ratio of 90:10 and were mixed by so-called mechanical milling for 24 hours to obtain a negative electrode active material. This negative electrode active material (average particle size $D_{50}$=5 μm) and polyimide (PI, manufactured by Ube Industries, Ltd., trade name: U-varnish A) as a binder for negative electrode were weighed in a mass ratio of 85:15, and were mixed with n-methyl pyrrolidone to obtain a negative electrode slurry. The negative electrode slurry was applied to a copper foil of a thickness of 10 μm and then dried, and the resultant was further subjected to a heat treatment under a nitrogen atmosphere at 300° C. to prepare a negative electrode.

Lithium nickel oxide ($LiNi_{0.75}Co_{0.15}Al_{0.15}O_2$) as a positive electrode active material, carbon black as a conductive assistant, and polyvinylidene fluoride as a binder for positive electrode were weighed in a mass ratio of 90:5:5, and were mixed with n-methyl pyrrolidone to obtain a positive electrode slurry. The positive electrode slurry was applied to an aluminum foil of a thickness of 20 μm and then dried, and the resultant was further pressed to prepare a positive electrode.

Three layers of the positive electrode and four layers of the negative electrode obtained as described above were alternately stacked with a polypropylene porous film as a separator sandwiched therebetween. End portions of positive electrode collectors not covered with the positive electrode active material and end portions of negative electrode collectors not covered with the negative electrode active material were respectively welded to one another, and onto the welded portions, a positive electrode terminal of aluminum and a negative electrode terminal of nickel were respectively welded, and thus, an electrode element having a planar layered structure was obtained.

On the other hand, a carbonyl compound represented by the above formula (101) was mixed, in a concentration of 2% by mass, with a liquid containing $LiPF_6$ as a supporting electrolyte dissolved in a concentration of 1 mol/L in a carbonate nonaqueous electrolyte solvent containing EC/DEC=30/70 (in a volume ratio), and thus an electrolyte solution was obtained.

The aforementioned electrode element was enclosed in an aluminum laminated film as an outer package, and the electrolyte solution was injected into the inside of the outer package. The resultant was then sealed while reducing the pressure to 0.1 atm, thereby producing a secondary battery.

Examples 2 to 5

Secondary batteries were produced in the same manner as in Example 1 except that compounds represented by the above formulas (107), (111), (132), (134) were respectively used as the carbonyl compound.

Example 6

A secondary battery was produced in the same manner as in Example 1 except that the polyimide as the binder for negative electrode was replaced with polyamide-imide (PAI, manufactured by Toyobo Co., Ltd., trade name: VYLO-MAX (registered trademark)).

Examples 7 to 10

Secondary batteries were produced in the same manner as in Example 6 except that compounds represented by the above formulas (107), (111), (132), (134) were respectively used as the carbonyl compound.

Example 11

Simple silicon having an average particle size of 5 μm as silicon, amorphous silicon oxide ($SiO_x$, $0<x\leq2$) having an average particle size of 13 μm as a silicon compound, and graphite having an average particle size of 30 μm as a carbon material were weighed in a mass ratio of 29:61:10, and were mixed by so-called mechanical milling for 24 hours to obtain a negative electrode active material consisting of a Si/SiO/C complex. In this negative electrode active material, the simple silicon was dispersed in the silicon oxide ($SiO_x$, $0<x\leq2$).

Then, a secondary battery was produced in the same manner as in Example 1 except that this negative electrode active material (average particle size $D_{50}=5$ μn) consisting of the Si/SiO/C complex was used.

Examples 12 to 15

Secondary batteries were produced in the same manner as in Example 11 except that compounds represented by the above formulas (107), (111), (132), (134) were respectively used as the carbonyl compound.

Example 16

A secondary battery was produced in the same manner as in Example 11 except that the polyimide as the binder for negative electrode was replaced with polyamide-imide (PAL manufactured by Toyobo Co., Ltd., trade name: VYLO-MAX (registered trademark)).

Examples 17 to 20

Secondary batteries were produced in the same manner as in Example 16 except that compounds represented by the above formulas (107), (111), (132), (134) were respectively used as the carbonyl compound.

Comparative Example 1

A secondary battery was produced in the same manner as in Example 1 except that the electrolyte solution used herein was a liquid containing $LiPF_6$ as a supporting electrolyte dissolved in a concentration of 1 mol/L in a carbonate nonaqueous electrolyte solvent containing EC/DEC=30/70 (in a volume ratio).

Comparative Example 2

A secondary battery was produced in the same manner as in Example 6 except that the electrolyte solution used herein was a liquid containing $LiPF_6$ as a supporting electrolyte dissolved in a concentration of 1 mol/L in a carbonate nonaqueous electrolyte solvent containing EC/DEC=30/70 (in a volume ratio).

Comparative Example 3

A secondary battery was produced in the same manner as in Example 11 except that the electrolyte solution used herein was a liquid containing $LiPF_6$ as a supporting electrolyte dissolved in a concentration of 1 mol/L in a carbonate nonaqueous electrolyte solvent containing EC/DEC=30/70 (in a volume ratio).

Comparative Example 4

A secondary battery was produced in the same manner as in Example 16 except that the electrolyte solution used herein was a liquid containing $LiPF_6$ as a supporting electrolyte dissolved in a concentration of 1 mol/L in a carbonate nonaqueous electrolyte solvent containing EC/DEC=30/70 (in a volume ratio).

<Evaluation>

In the secondary batteries produced in Examples 1 to 20 and Comparative Examples 1 to 4, cycle characteristics under a high-temperature environment were evaluated.

Specifically, each secondary battery was subjected to a test in which a charge/discharge cycle was repeated 50 times in a voltage range of 2.5 V to 4.1 V in a thermostat chamber kept at 60° C. Then, a retention ratio was calculated as (the discharge capacity at 50th cycle)/(the discharge capacity at 5th cycle) (unit: %). Also, an expansion ratio was calculated as (the battery volume at 50th cycle)/(the battery volume before repeating cycle) (unit: %). The results are shown in Tables 1.

The retention ratio was determined as "○" when it is 50% or more, determined as "Δ" when it is 25% or more and less than 50%, and determined as "x" when it is less than 25%. The expansion ratio was determined as "○" when it is less than 10%, determined as "Δ" when it is 10% or more and less than 20%, and determined as "x" when it is 20% or more.

TABLE 1

| Examples | Negative electrode active material Si/SiO$_x$/C (mass ratio) | Binder for negative electrode | Conjugated carbonyl compound | Cycle characteristic at 60° C. | | | |
|---|---|---|---|---|---|---|---|
| | | | | Retention ratio | | Expansion ratio | |
| | | | | % | Judgment | % | Judgment |
| Ex. 1 | 90/0/10 | PI | 101 | 55 | ○ | 5 | ○ |
| Ex. 2 | 90/0/10 | PI | 107 | 56 | ○ | 6 | ○ |
| Ex. 3 | 90/0/10 | PI | 111 | 58 | ○ | 7 | ○ |
| Ex. 4 | 90/0/10 | PI | 132 | 59 | ○ | 6 | ○ |
| Ex. 5 | 90/0/10 | PI | 134 | 60 | ○ | 7 | ○ |

TABLE 1-continued

| Examples | Negative electrode active material Si/SiO$_x$/C (mass ratio) | Binder for negative electrode | Conjugated carbonyl compound | Cycle characteristic at 60° C. | | | |
|---|---|---|---|---|---|---|---|
| | | | | Retention ratio % | Judgment | Expansion ratio % | Judgment |
| Ex. 6 | 90/0/10 | PAI | 101 | 69 | ○ | 4 | ○ |
| Ex. 7 | 90/0/10 | PAI | 107 | 73 | ○ | 5 | ○ |
| Ex. 8 | 90/0/10 | PAI | 111 | 71 | ○ | 5 | ○ |
| Ex. 9 | 90/0/10 | PAI | 132 | 69 | ○ | 6 | ○ |
| Ex. 10 | 90/0/10 | PAI | 134 | 70 | ○ | 6 | ○ |
| Ex. 11 | 29/61/10 | PI | 101 | 64 | ○ | 5 | ○ |
| Ex. 12 | 29/61/10 | PI | 107 | 62 | ○ | 5 | ○ |
| Ex. 13 | 29/61/10 | PI | 111 | 62 | ○ | 6 | ○ |
| Ex. 14 | 29/61/10 | PI | 132 | 65 | ○ | 6 | ○ |
| Ex. 15 | 29/61/10 | PI | 134 | 65 | ○ | 6 | ○ |
| Ex. 16 | 29/61/10 | PAI | 101 | 70 | ○ | 6 | ○ |
| Ex. 17 | 29/61/10 | PAI | 107 | 71 | ○ | 6 | ○ |
| Ex. 18 | 29/61/10 | PAI | 111 | 75 | ○ | 4 | ○ |
| Ex. 19 | 29/61/10 | PAI | 132 | 73 | ○ | 5 | ○ |
| Ex. 20 | 29/61/10 | PAI | 134 | 72 | ○ | 4 | ○ |
| Com.-Ex. 1 | 90/0/10 | PI | none | 41 | Δ | 23 | X |
| Com.-Ex. 2 | 90/0/10 | PAI | none | 40 | Δ | 19 | Δ |
| Com.-Ex. 3 | 29/61/10 | PI | none | 42 | Δ | 24 | X |
| Com.-Ex. 4 | 29/61/10 | PAI | none | 42 | Δ | 27 | X |

Ex.: Example
Com.-Ex.: Comparative Example

<Supplementary Notes>

The matters disclosed in the present application are summarized as follows:

1. A secondary battery, comprising an electrode element in which a positive electrode and a negative electrode are opposed to each other, and an electrolyte solution,
wherein the negative electrode active material comprises a metal alloyable with lithium, and/or a metal oxide capable of intercalating/deintercalating lithium ions, and
the electrolyte solution is a nonaqueous electrolyte solution comprising an electrolyte salt dissolved in a nonaqueous solvent, and comprises a carbonyl compound represented by the following formula (1):

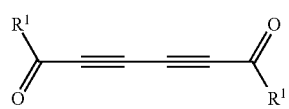
(1)

wherein two $R^1$s may be the same or different from each other, and each independently represents hydrogen atom, substituted or unsubstituted alkyl group, cycloalkyl group, alkenyl group, alkynyl group, substituted or unsubstituted aromatic group, oxyalkylene group represented by the following formula (2):

$$—(R^{21}O)_n—R^{22} \qquad (2)$$

wherein $R^{21}$ represents alkylene group having 1 to 6 carbon atoms,
$R^{22}$ represents hydrocarbon group having 1 to 12 carbon atoms, and n represents an integer of 1 to 10,
substituted or unsubstituted alkoxy group, cycloalkyloxy group, alkenyloxy group, alkynyloxy group, substituted or unsubstituted aromatic oxy group, or oxyalkyleneoxy group represented by the following formula (2b):

$$—O—(R^{21}O)_n—R^{22} \qquad (2b)$$

wherein $R^{21}$ represents alkylene group having 1 to 6 carbon atoms,
$R^{22}$ represents hydrocarbon group having 1 to 12 carbon atoms, and n represents an integer of 1 to 10.

2. The secondary battery according to item 1 above, wherein two $R^1$s of the formula (1) each independently represent a group selected from:
unsubstituted alkyl group having 1 to 12 carbon atoms;
substituted alkyl group selected from the group consisting of fluoroalkyl group, amino alkyl group having a substituent —$NR^{11}R^{12}$ (wherein $R^{11}$ and $R^{12}$ each independently represent H or alkyl group having 1 to 6 carbon atoms), and cyanoalkyl group;
substituted or unsubstituted aromatic group selected from the group consisting of aryl group, arylalkyl group and alkylaryl group, which optionally has —CN or halogen as a substituent on the aromatic ring;
oxyalkylene group represented by the following formula (2):

$$—(R^{21}O)_n—R^{22} \qquad (2)$$

wherein $R^{21}$ represents alkylene group having 1 to 6 carbon atoms,
$R^{22}$ represents hydrocarbon group having 1 to 12 carbon atoms,
and n represents an integer of 1 to 10;
unsubstituted alkoxy group having 1 to 12 carbon atoms;
substituted alkoxy group selected from the group consisting of fluoroalkoxy group, amino alkoxy group having a substituent —$NR^{11}R^{12}$ (wherein $R^{11}$ and $R^{12}$ each independently represent H or alkyl group having 1 to 6 carbon atoms), and cyanoalkoxy group;
substituted or unsubstituted aromatic oxy group selected from the group consisting of aryloxy group, arylalkyloxy group and alkylaryloxy group, which optionally has —CN or halogen as a substituent on the aromatic ring; and
oxyalkyleneoxy group represented by the following formula (2b):

$$—O—(R^{21}O)_n—R^{22} \qquad (2b)$$

wherein $R^{21}$ represents alkylene group having 1 to 6 carbon atoms,
$R^{22}$ represents hydrocarbon group having 1 to 12 carbon atoms,
and n represents an integer of 1 to 10.

3. The secondary battery according to item 2 above, wherein two $R^1$s of the formula (1) each independently represent a group selected from:
unsubstituted alkoxy group having 1 to 12 carbon atoms;
substituted alkoxy group selected from the group consisting of fluoroalkoxy group, amino alkoxy group having a substituent —$NR^{11}R^{12}$ (wherein $R^{11}$ and $R^{12}$ each independently represent H or alkyl group having 1 to 6 carbon atoms), and cyanoalkoxy group;
substituted or unsubstituted aromatic oxy group selected from the group consisting of aryloxy group, arylalkyloxy group and alkylaryloxy group, which optionally has —CN or halogen as a substituent on the aromatic ring; and
oxyalkyleneoxy group represented by the following formula (2b):

$$—O—(R^{21}O)_n—R^{22} \qquad (2b)$$

wherein $R^{21}$ represents alkylene group having 1 to 6 carbon atoms, $R^{22}$ represents hydrocarbon group having 1 to 12 carbon atoms, and n represents an integer of 1 to 10.

4. The secondary battery according to any one of items 1 to 3 above, wherein a content of the carbonyl compound represented by the formula (1) in the nonaqueous electrolyte solution is in the range of 0.1 to 2 wt %.

5. The secondary battery according to any one of items 1 to 4 above, wherein the negative electrode active material comprises silicon and/or a silicon oxide.

6. The secondary battery according to item 5 above, wherein the negative electrode active material is a silicon/silicon oxide/carbon complex comprising silicon, a silicon oxide and a carbon material.

7. The secondary battery according to any one of items 1 to 6 above, having an outer package housing the electrode element and the electrolyte solution, wherein the outer package is a laminated film.

8. The secondary battery according to item 7 above, wherein the secondary battery is a layered laminated type having an electrode element in which the negative electrode and the positive electrode are laminated with a separator sandwiched therebetween.

9. An assembled battery including a plurality of secondary batteries according to any one of items 1 to 8 above.

10. A vehicle including, as a motor driving power supply, the secondary battery according to any one of items 1 to 8 above, or the assembled battery according to item 9 above.

INDUSTRIAL APPLICABILITY

The present embodiment can be utilized in, for example, all the industrial fields requiring a power supply and the industrial fields pertaining to the transportation, storage and supply of electric energy. Specifically, it can be used in, for example, power supplies for mobile equipment such as cellular phones and notebook personal computers; power supplies for moving/transporting media such as trains, satellites and submarines including electrically driven vehicles such as an electric vehicle, a hybrid vehicle, an electric motorbike, and an electric-assisted bike; backup power supplies for UPSs; and electricity storage facilities for storing electric power generated by photovoltaic power generation, wind power generation and the like.

Explanation of Symbols a: negative electrode
b: separator
c: positive electrode
d: negative electrode collector
e: positive electrode collector
f: positive electrode terminal
g: negative electrode terminal

The invention claimed is:

1. A secondary battery, comprising an electrode element in which a positive electrode and a negative electrode are opposed to each other, and an electrolyte solution, wherein the negative electrode active material comprises a metal alloyable with lithium, and/or a metal oxide capable of intercalating/deintercalating lithium ions, and the electrolyte solution is a nonaqueous electrolyte solution comprising an electrolyte salt dissolved in a nonaqueous solvent, and comprises a carbonyl compound represented by the following formula (1):

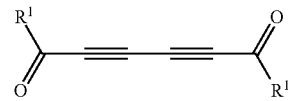

wherein two $R^1$s may be the same or different from each other, and each independently represents hydrogen atom, substituted or unsubstituted alkyl group, cycloalkyl group, alkenyl group, alkynyl group, substituted or unsubstituted aromatic group, oxyalkylene group represented by the following formula (2):

$$-(R^{21}O)_n-R^{22} \quad (2)$$

wherein $R^{21}$ represents alkylene group having 1 to 6 carbon atoms, $R^{22}$ represents hydrocarbon group having 1 to 12 carbon atoms, and n represents an integer of 1 to 10, substituted alkoxy group, cycloalkyloxy group, alkenyloxy group, alkynyloxy group, substituted or unsubstituted aromatic oxy group, or oxyalkyleneoxy group represented by the following formula (2b):

$$-O-(R^{21}O)_n-R^{22} \quad (2b)$$

wherein $R^{21}$ represents alkylene group having 1 to 6 carbon atoms, $R^{22}$ represents hydrocarbon group having 1 to 12 carbon atoms, and n represents an integer of 1 to 10.

2. The secondary battery according to claim 1, wherein two $R^1$s of the above formula (1) are each independently a group selected from:

unsubstituted alkyl group having 1 to 12 carbon atoms;

substituted alkyl group selected from the group consisting of fluoroalkyl group, amino alkyl group having a substituent $-NR^{11}R^{12}$, wherein $R^{11}$ and $R^{12}$ each independently represent H or alkyl group having 1 to 6 carbon atoms, and cyanoalkyl group;

substituted or unsubstituted aromatic group selected from the group consisting of aryl group, arylalkyl group and alkylaryl group, which optionally has $-CN$ or halogen as a substituent on the aromatic ring;

oxyalkylene group represented by the following formula (2):

$$-(R^{21}O)_n-R^{22} \quad (2)$$

wherein $R^{21}$ represents alkylene group having 1 to 6 carbon atoms, $R^{22}$ represents hydrocarbon group having 1 to 12 carbon atoms, and n represents an integer of 1 to 10;

substituted alkoxy group selected from the group consisting of fluoroalkoxy group, amino alkoxy group having a substituent $-NR^{11}R^{12}$, wherein $R^{11}$ and $R^{12}$ each independently represent H or alkyl group having 1 to 6 carbon atoms, and cyanoalkoxy group;

substituted or unsubstituted aromatic oxy group selected from the group consisting of aryloxy group, arylalkyloxy group and alkylaryloxy group, which optionally has $-CN$ or halogen as a substituent on the aromatic ring; and oxyalkyleneoxy group represented by the following formula (2b):

$$-O-(R^{21}O)_n-R^{22} \quad (2b)$$

wherein $R^{21}$ represents alkylene group having 1 to 6 carbon atoms, $R^{22}$ represents hydrocarbon group having 1 to 12 carbon atoms, and n represents an integer of 1 to 10.

3. The secondary battery according to claim 2, wherein two $R^1$s of the above formula (1) are each independently a group selected from:
substituted alkoxy group selected from the group consisting of fluoroalkoxy group, amino alkoxy group having a substituent $-NR^{11}R^{12}$, wherein $R^{11}$ and $R^{12}$ each independently represent H or alkyl group having 1 to 6 carbon atoms, and cyanoalkoxy group;
substituted or unsubstituted aromatic oxy group selected from the group consisting of aryloxy group, arylalkyloxy group and alkylaryloxy group, which optionally has —CN or halogen as a substituent on the aromatic ring; and
oxyalkyleneoxy group represented by the following formula (2b):

wherein $R^{21}$ represents alkylene group having 1 to 6 carbon atoms, $R^{22}$ represents
hydrocarbon group having 1 to 12 carbon atoms, and n represents an integer of 1 to 10.

4. The secondary battery according to claim 1, wherein the content of the carbonyl compound represented by the above formula (1) in the nonaqueous electrolyte solution is in the range of 0.1 to 2 wt %.

5. The secondary battery according to claim 1 wherein the negative electrode active material comprises silicon and/or a silicon oxide.

6. The secondary battery according to claim 5, wherein the negative electrode active material is a silicon/silicon oxide/carbon complex comprising silicon, a silicon oxide and a carbon material.

7. The secondary battery according to claim 1, comprising an outer package housing the electrode element and the electrolyte solution, wherein the outer package is a laminated film.

8. The secondary battery according to claim 7, wherein the secondary battery is a layered laminated type having an electrode element in which the negative electrode and the positive electrode are laminated with a separator sandwiched therebetween.

9. An assembled battery comprising a plurality of the secondary batteries according to claim 1.

10. A vehicle comprising, as a motor driving power supply, the secondary battery according to claim 1.

* * * * *